Feb. 19, 1957  V. ŠAPOŠNIKOV ET AL  2,781,644
METHOD FOR OPERATING AN ABSORPTION REFRIGERATING SYSTEM
Filed Nov. 9, 1954

INVENTORS
Vsevolod Šapošnikov
Miroslav Patrman
By Richard [Ag't]

United States Patent Office 2,781,644
Patented Feb. 19, 1957

2,781,644
METHOD FOR OPERATING AN ABSORPTION REFRIGERATING SYSTEM

Vsevolod Šapošnikov, Prague-Podli, and Miroslav Patrman, Prague-Stresovice, Czechoslovakia, assignors to VSCHP, Vyzkumny ustav stroju chladicich a potravinarskych, Prague, Czechoslovakia Application November 9, 1954, Serial No. 467,848

Claims priority, application Czechoslovakia November 11, 1953

3 Claims. (Cl. 62—119)

The present invention relates to improvements in an absorption refrigerating system and refers more particularly to a method and apparatus for operating an absorption refrigerating system with a two-component refrigerant, in particular for high initial refrigerating performance, rapid initial cooling (short pull-down time) and low evaporation temperatures down to minus 70° C.

Absorption refrigerating systems with a two-component refrigerant, such as ammonia and water, are well known. In order to obtain a low evaporating temperature of the refrigerant, e. g. as low as minus 70° C., as required in certain cases, the pressure in the evaporator has to be approximately 0.1 kg./cm.$^2$ abs. which is also the pressure under which the vapors of the refrigerant have to be absorbed by the weak solution. Considering the absorption taking place under so low a pressure, while the absorber is cooled with water, for instance to a temperature of plus 20° C., it is obvious that a sufficiently high concentration of the strong solution of ammonia in water cannot be obtained and the regeneration of the refrigerant is practically impossible.

The main object of the present invention is the provision of a method for operating an absorption refrigerating system with a two-component refrigerant, for instance ammonia and water, making it possible to achieve an extraordinary high initial refrigerating performance at an evaporating temperature as low as minus 70° C., so as to shorten the pull-down time to a minimum.

A further object of the invention is to provide a method for operating an absorption refrigerating system with a view of obtaining maximum refrigerating capacity in the initial stages of refrigeration and to keep the refrigerating capacity of the system at a high level throughout its operation.

Another object of the invention is the provision of an apparatus for carrying out the method outlined above to obtain maximum refrigerating capacity at the beginning of operation with low evaporation temperatures even in single stage absorption systems and to maintain the performance of the system at a high level throughout its operation.

With these and other objects in view the present invention consists substantially in cooling the contents of the absorber of an absorption refrigerating system to a temperature below the freezing point of the weak solution of the refrigerant in the absorbent.

The temperature of the contents of the absorber may be lowered below the freezing point of said weak solution before the operation of the main refrigerating system and, if desired, may be maintained at this level during the operation thereof.

In this way a store of ice is produced in the absorber preliminary to the commencement of operation of the refrigeration system, to provide an accumulation of cold for the initial stages of operation.

The invention has for its further object the provision of a refrigeration system adapted to operate in accordance with the method disclosed.

This object of the invention may be realized through the provision of an absorption refrigerating system, in which the absorber is provided with an auxiliary refrigerator adapted either for direct cooling by the refrigerant or for indirect cooling by means of brine.

The invention will appear more clearly from the following detailed description when taken in connection with the accompanying drawing, showing preferred embodiments of the inventive idea.

Figure 1:
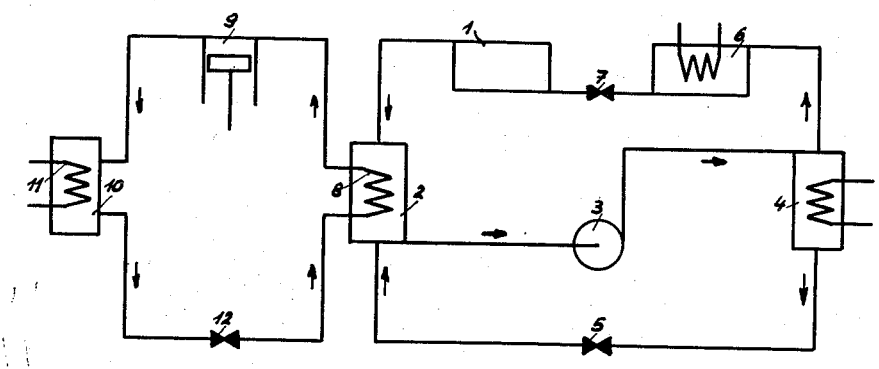
Figure 1 shows a diagram of the absorption refrigerating system.

An evaporator 1 is mounted in the space to be cooled and ammonia is evaporated therein under low pressure, corresponding to the required low evaporation temperature, the ammonia vapor being absorbed by the weak aqueous solution in the absorber 2. The strong solution produced is delivered by a pump 3 to a generator 4, wherefrom the weak solution is returned to the absorber 2 through a pressure reducing valve 5 and the ammonia vapor is supplied to a condenser 6, where liquid ammonia is obtained, which after passing through an expansion valve 7 is brought into the evaporator 1.

According to the present invention an auxiliary circuit for the refrigeration of the absorber 2 is provided. This auxiliary circuit comprises an evaporator 8, which represents the refrigerator of the absorber 2. Vapors of the refrigerant proceed to the compressor 9 and are delivered into a condenser 10, 11, from which the liquified refrigerant flows through a pressure reducing valve 12 back into the evaporator (auxiliary refrigerator) 8.

By means of the auxiliary refrigeration circuit the refrigerator 8, located in the absorber 2, is refrigerated either directly by the refrigerant or indirectly by means of brine, to a temperature under 0° C. Upon a drop in temperature of the auxiliary refrigerator 8 below the freezing point of the aqueous solution of ammonia in the absorber 2, ice from the solution is deposited on the tubes and ribs of the refrigerator 8, said ice representing an accumulation of cold for the maximum performance of the absorber 2, for instance during the rapid cooling (pull-down) period in the initial stages of operation of the system. At the same time a substantial cooling of the strong solution leaving the absorber 2 through the tube 22 is achieved. The possibility of ammonia escaping from the solution at the suction side of the pump 3 is thus materially reduced.

Owing to the accumulation of water ice in the absorber 2, in which ice is produced by the auxiliary refrigerating circuit before the proper absorption system is set into operation, an extraordinary rapid cooling (pull-down) within a very short period may be obtained.

The performance of the auxiliary refrigerator 8 during subsequent normal operation of the system may be either such as to maintain the temperature of the contents of the absorber below the freezing point of the aqueous solution of ammonia or may be allowed to rise above this point, according to requirements. It is to be understood that the amount of ice formed on the auxiliary cooling coil 8, before normal operation or during normal operation, is only sufficient to provide the desired accumulation of cold and that, in any case, a substantial proportion of the solution in the absorber 2 remains in liquid condition.

Figure 2:
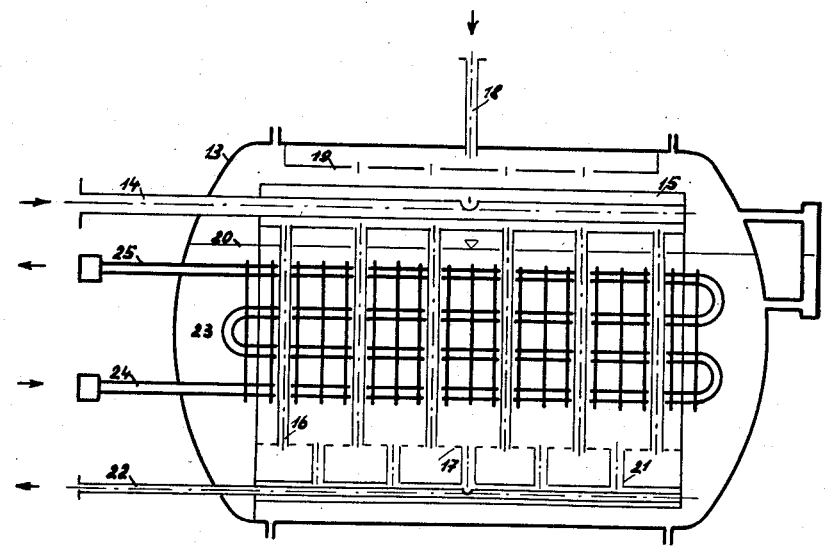
Figure 2 is a longitudinal section of an absorber, adapted for operation according to the new method.

Fig. 2 shows one of a plurality of possible arrangements of the absorber for the system according to the invention.

In the body 13 of the absorber, well insulated against heat losses, a tube 14 is mounted in its upper portion, said tube serving for the admission of ammonia vapors from the evaporator 1 into the absorber. The tube 14 is surrounded by a distributor 15 of vapor, a system of vertical tubes 16 being operatively connected to the distributor and opening at their lower ends below a sieve or wire mesh 17. A tube 18, supplying weak solution from the generator 4 is mounted in the top portion of the absorber body 13, said tube leading to a distributor 19, which distributes the solution evenly over the level 20 of the solution in the absorber. Underneath the wire mesh 17 a collector 21 is located, said collector leading from the space above the wire mesh 17 to an outlet tubing 22 for the strong solution.

In the central portion of the absorber a refrigerator 23, for instance of the ribbed tube type, is housed, said refrigerator being the evaporator of the auxiliary circuit and generally designated with the reference numeral 8 in the diagram in Fig. 1. The refrigerator 23 has an inlet tube 24 and outlet tube 25 connected to the refrigerating circuit as shown in Fig. 1.

The ammonia vapor supplied from the evaporator 1 through the tube 14 is distributed by the distributor 15 into the system of vertical tubes 16 through which it flows below the surface of the absorbent under the wire mesh 17, which distributes evenly the vapor. The weak solution from the generator 4 enters the absorber through the tubing 18 and is distributed by the distributor 19 evenly over the surface 20 of the solution. The strong solution from the space above the wire mesh 17 is withdrawn through the collector 21 into the tube 22 and from here by means of the pump 3 into the generator 4.

The refrigerator 23 (8) of the absorber is cooled either directly by means of the refrigerant or indirectly by means of brine, as described above, so that ice is deposited on the tubes and ribs of the refrigerator and forms a store or accumulation of cold for use in the initial stages of operation of the system to provide for rapid cooling.

We claim:

1. In the method of absorption cooling with a two component, ammonia-water refrigerant in a cooling plant wherein ammonia is evaporated in an evaporator within the space to be cooled and is thereafter absorbed by a weak aqueous solution of ammonia in an absorber to produce a strong solution which is pumped to a generator where ammonia is separated from the weak solution for return of the latter to the absorber while the separated ammonia is fed through a condenser and an expansion valve to the evaporator; the further step of cooling the aqueous solution of ammonia in the absorber to a temperature below that at which solidification of said solution occurs so that ice is frozen out of said solution for obtaining a low evaporating temperature of the refrigerant up to minus 70° centigrade and a high initial cooling performance.

2. In the method of absorption cooling with a two component, ammonia-water refrigerant in a cooling plant wherein ammonia is evaporated in an evaporator within the space to be cooled and is thereafter absorbed by a weak aqueous solution of ammonia in an absorber to produce a strong solution which is pumped to a generator where ammonia is separated from the weak solution for return of the latter to the absorber while the separated ammonia is fed through a condenser and an expansion valve to the evaporator; the further step of circulating an auxiliary cooling medium through an auxiliary cooling coil in the absorber at a temperature below 0° centigrade prior to the operation of said cooling plant so that ice freezes out of a portion of the water in the aqueous solution in the absorber and collects on the auxiliary cooling coil to form an accumulation of cold that results in a high initial cooling performance of the cooling plant when operation of the latter is commenced.

3. In the method of absorption cooling with a two component, ammonia-water refrigerant in a cooling plant wherein ammonia is evaporated in an evaporator within the space to be cooled and is thereafter absorbed by a weak aqueous solution of ammonia in an absorber to produce a strong solution which is pumped to a generator where ammonia is separated from the weak solution for return of the latter to the absorber while the separated ammonia is fed through a condenser and an expansion valve to the evaporator; the further step of circulating an auxiliary cooling medium through an auxiliary cooling coil in the absorber at a temperature below 0° centigrade during the operation of said cooling plant to freeze out ice from a portion of the water in the aqueous solution in the absorber, so that the ice collecting on the auxiliary coil forms an accumulation of cold for obtaining a low evaporating temperature of the refrigerant up to minus 70° centigrade.

References Cited in the file of this patent
UNITED STATES PATENTS

| | | |
|---|---|---|
| 552,991 | Ellis | Jan. 14, 1896 |
| 2,408,802 | Miller | Oct. 8, 1946 |
| 2,548,508 | Wolfner | Apr. 10, 1951 |